United States Patent [19]
Arman et al.

[11] Patent Number: 6,065,305
[45] Date of Patent: May 23, 2000

[54] MULTICOMPONENT REFRIGERANT COOLING WITH INTERNAL RECYCLE

[75] Inventors: Bayram Arman, Grand Island; Walter Joseph Olszewski, Amherst; Joseph Alfred Weber, Cheektowaga; Dante Patrick Bonaquist, Grand Island; Arun Acharya, East Amherst; John Henri Royal, Grand Island, all of N.Y.

[73] Assignee: Praxair Technology, Inc., Danbury, Conn.

[21] Appl. No.: 09/222,815

[22] Filed: Dec. 30, 1998

[51] Int. Cl.[7] .................................................. F25J 1/00
[52] U.S. Cl. ................................................ 62/613; 62/619
[58] Field of Search ......................................... 62/613, 619

[56] References Cited

U.S. PATENT DOCUMENTS

| | | | |
|---|---|---|---|
| 3,677,019 | 7/1972 | Olszewski | 62/613 |
| 3,690,114 | 9/1972 | Swearingen et al. | 62/40 |
| 3,733,845 | 5/1973 | Lieberman | 62/335 |
| 3,768,273 | 10/1973 | Missimer | 62/84 |
| 3,932,154 | 1/1976 | Coers et al. | 62/9 |
| 3,992,167 | 11/1976 | Beddome | 62/18 |
| 4,559,069 | 12/1985 | Becker | 62/613 |
| 4,566,886 | 1/1986 | Fabian et al. | 62/619 |
| 5,157,925 | 10/1992 | Denton et al. | 62/11 |
| 5,441,658 | 8/1995 | Boyarsky et al. | 252/67 |
| 5,450,728 | 9/1995 | Vora et al. | 62/613 |
| 5,644,931 | 7/1997 | Ueno et al. | 62/612 |
| 5,746,066 | 5/1998 | Manley . | |

*Primary Examiner*—Ronald Capossela
*Attorney, Agent, or Firm*—Stanley Ktorides

[57] ABSTRACT

A system for cooling a fluid particularly to a cryogenic temperature wherein a multicomponent refrigerant fluid is partially condensed, the liquid used to generate refrigeration to cool the product by recycle into an upstream portion of the warming leg of the refrigeration circuit, and the vapor, having a different composition than the liquid, is used to generate refrigeration at a colder temperature for further cooling of the product.

17 Claims, 3 Drawing Sheets

6,065,305

MULTICOMPONENT REFRIGERANT COOLING WITH INTERNAL RECYCLE

TECHNICAL FIELD

This invention relates generally to the cooling of product fluid and is particularly useful for the liquefaction of industrial gas wherein the gas is brought from ambient temperature to a cryogenic temperature to effect the liquefaction.

BACKGROUND ART

Cooling of fluids such as for the liquefaction of industrial gases is an important step which is used in many operations. In the case of the liquefaction of industrial gas, typically the industrial gas is liquefied by indirect heat exchange with a refrigerant. Such a system, while working well for providing refrigeration over a relatively small temperature range from ambient, is not as efficient when refrigeration over a large temperature range, such as from ambient to a cryogenic temperature, is required. One way this inefficiency has been addressed is to use a liquefaction scheme with multiple circuits wherein each circuit serves to reduce the temperature of the industrial gas until the requisite cryogenic condensing temperature is reached. However, such multiple circuit industrial gas liquefiers may be complicated to operate.

A conventional single circuit liquefier system is much less complicated than a multiple circuit liquefier but such a system imposes very stringent requirements on the selection of the refrigerant. One way of addressing this inflexibility problem is to use a multicomponent refrigerant fluid instead of the single component refrigerant conventionally used in cooling or liquefying circuits. However, even with the use of a multicomponent refrigerant fluid in a conventional single circuit system, it is difficult to carry out the cooling and/or liquefaction efficiently, especially over a large temperature range, such as from ambient temperature to a cryogenic temperature as would be necessary for the liquefaction of an industrial gas.

Accordingly, it is an object of this invention to provide an improved method for carrying out cooling of a fluid, such as for liquefying an industrial gas, which employs a multicomponent refrigerant fluid.

SUMMARY OF THE INVENTION

The above and other objects, which will become apparent to those skilled in the art upon a reading of this disclosure, are attained by the present invention which is:

A method for cooling a product fluid comprising:

(A) compressing a multicomponent refrigerant fluid comprising at least two components having different volatilities;

(B) partially condensing the compressed multicomponent refrigerant fluid and separating the resulting partially condensed multicomponent refrigerant fluid into a liquid portion and a remaining portion;

(C) expanding the liquid portion to generate refrigeration and vaporizing the expanded liquid portion by indirect heat exchange with product fluid to produce cooled product fluid; and (D) further cooling at least some of the remaining portion, expanding the further cooled remaining portion to generate refrigeration, and warming the expanded remaining portion by indirect heat exchange with cooled product fluid to produce further cooled product fluid.

As used herein the term "subcooling" means cooling a liquid to be at a temperature lower than that liquid's saturation temperature for the existing pressure.

As used herein the term "normal boiling point" means the boiling temperature at 1 standard atmosphere pressure, i.e. 14.696 pounds per square inch absolute.

As used herein the term "indirect heat exchange" means the bringing of fluids into heat exchange relation without any physical contact or intermixing of the fluids with each other.

As used herein the term "expansion" means to effect a reduction in pressure.

As used herein the terms "turboexpansion" and "turboexpander" means respectively method and apparatus for the flow of high pressure fluid through a turbine to reduce the pressure and the temperature of the fluid thereby generating refrigeration.

As used herein the term "non-toxic" means not posing an acute or chronic hazard when handled in accordance with acceptable exposure limits.

As used herein the term "non-flammable" means either having no flash point or a very high flash point of at least 600° K.

As used herein the term "non-ozone-depleting" means having zero-ozone depleting potential, i.e. having no chlorine, bromine or iodine atoms.

As used herein the term "variable load refrigerant" means a mixture of two or more components in proportions such that the liquid phase of those components undergoes a continuous and increasing temperature change between the bubble point and the dew point of the mixture. The bubble point of the mixture is the temperature, at a given pressure, wherein the mixture is all in the liquid phase but addition of heat will initiate formation of a vapor phase in equilibrium with the liquid phase. The dew point of the mixture is the temperature, at a given pressure, wherein the mixture is all in the vapor phase but extraction of heat will initiate formation of a liquid phase in equilibrium with the vapor phase. Hence, the temperature region between the bubble point and the dew point of the mixture is the region wherein both liquid and vapor phases coexist in equilibrium. In the practice of this invention the temperature differences between the bubble point and the dew point for the variable load refrigerant is at least 10° K., preferably at least 20° K. and most preferably at least 50° K.

As used herein the term "fluorocarbon" means one of the following: tetrafluoromethane ($CF_4$), perfluoroethane ($C_2F_6$), perfluoropropane ($C_3F_8$), perfluorobutane ($C_4F_{10}$), perfluoropentane ($C_5F_{12}$), perfluoroethene ($C_2F_4$), perfluoropropene ($C_3F_6$), perfluorobutene ($C_4F_8$), perfluoropentene ($C_5F_{10}$), hexafluorocyclopropane (cyclo—$C_3F_6$) and octafluorocyclobutane (cyclo—$C_4F_8$).

As used herein the term "hydrofluorocarbon" means one of the following: fluoroform ($CHF_3$), pentafluoroethane ($C_2HF_5$), tetrafluoroethane ($C_2H_2F_4$), heptafluoropropane ($C_3HF_7$), hexafluoropropane ($C_3H_2F_6$), pentafluoropropane ($C_3H_3F_5$), tetrafluoropropane ($C_3H_4F_4$), nonafluorobutane ($C_4HF_9$), octafluorobutane ($C_4H_2F_8$), undecafluoropentane ($C_5HF_{11}$), methyl fluoride ($CH_3F$), difluoromethane ($CH_2F_2$), ethyl fluoride ($C_2H_5F$), difluoroethane ($C_2H_4F_2$), trifluoroethane ($C_2H_3F_3$), difluoroethene ($C_2H_2F_2$), trifluoroethene ($C_2HF_3$), fluoroethene ($C_2H_3F$), pentafluoropropene ($C_3HF_5$), tetrafluoropropene ($C_3H_2F_4$), trifluoropropene ($C_3H_3F_3$), difluoropropene ($C_3H_4F_2$), heptafluorobutene ($C_4HF_7$), hexafluorobutene ($C_4H_2F_6$) and nonafluoropentene ($C_5HF_9$).

As used herein the term "fluoroether" means one of the following: trifluoromethyoxy-perfluoromethane ($CF_3$—O—$CF_3$), difluoromethoxy-perfluoromethane ($CHF_2$—O—$CF_3$), fluoromethoxy-perfluoromethane ($CH_2F$—O—$CF_3$), difluoromethoxy-difluoromethane ($CHF_2$—O—$CHF_2$), difluoromethoxy-perfluoroethane ($CHF_2$—O—$C_2F_5$), difluoromethoxy-1,2,2,2-tetrafluoroethane ($CHF_2$—O—$C_2HF_4$), difluoromethoxy-1,1,2,2-tetrafluoroethane ($CHF_2$—O—$C_2HF_4$), perfluoroethoxy-fluoromethane ($C_2F_5$—O—$CH_2F$), perfluoromethoxy-1,1,2-trifluoroethane ($CF_3$—O—$C_2H_2F_3$) perfluoromethoxy-1,2,2-trifluoroethane ($CF_3O$—$C_2H_2F_3$), cyclo-1,1, 2,2-tetrafluoropropylether (cyclo—$C_3H_2F_4$—O—), cyclo-1,1,3,3-tetrafluoropropylether (cyclo—$C_3H_2F_4$—O—), perfluoromethoxy-1,1,2,2- tetrafluoroethane ($CF_3$—O—$C_2HF_4$), cyclo-1,1,2,3,3-pentafluoropropylether (cyclo—$C_3H_5$—O—), perfluoromethoxy-perfluoroacetone ($CF_3$—O—$CF_2$—O—$CF_3$), perfluoromethoxy-perfluoroethane ($CF_3$—O—$C_2F_5$), perfluoromethoxy-1,2,2,2-tetrafluoroethane ($CF_3$—O—$C_2HF_4$), perfluoromethoxy-2,2,2-trifluoroethane ($CF_3$—O—$C_2H_2F_3$), cyclo-perfluoromethoxy-perfluoroacetone (cyclo—$CF_2$—O—$CF_2$—O—$CF_2$—) and cyclo-perfluoropropylether (cyclo—$C_3F_6$—O).

As used herein the term "atmospheric gas" means one of the following: nitrogen ($N_2$), argon (Ar), krypton (Kr), xenon (Xe), neon (Ne), carbon dioxide ($CO_2$), oxygen ($O_2$) and helium (He).

As used herein the term "low-ozone-depleting" means having an ozone depleting potential less than 0.15 as defined by the Montreal Protocol convention wherein dichlorofluoromethane ($CCl_2F_2$) has an ozone depleting potential of 1.0.

As used herein the term "industrial gas" means nitrogen, oxygen, argon, hydrogen, helium, carbon dioxide, carbon monoxide, methane and fluid mixtures containing two or more thereof.

As used herein the term "cryogenic temperature" means a temperature of 150° K. or less.

As used herein the term "refrigeration" means the capability to reject heat from a subambient temperature system to the surrounding atmosphere.

DETAILED DESCRIPTION

The invention comprises, in general, the use of a mixed refrigerant to efficiently provide refrigeration over a very large temperature range, such as from ambient temperature to a cryogenic temperature. Such refrigeration can be effectively employed for the liquefaction of industrial gases, which calls for such a wide temperature range, without the need for employing complicated multiple refrigeration circuits.

In the practice of this invention, multicomponent refrigerant fluid is partially condensed and then separated into liquid and vapor, with the liquid containing a majority of and preferably most of the least volatile component of the multicomponent refrigerant fluid. The liquid does not continue to the end of the cooling leg of the cooling circuit, but rather is recycled to the compression, with or without subcooling, thereby transferring its refrigeration to the product fluid for cooling. The vapor, containing the more volatile component(s) of the multicomponent refrigerant fluid, continues to be cooled, and generally condensed to the end of the cooling leg of the circuit, and then is used to transfer refrigeration to the product fluid at a colder temperature, thus improving the overall efficiency of the cooling circuit.

Figure 1:
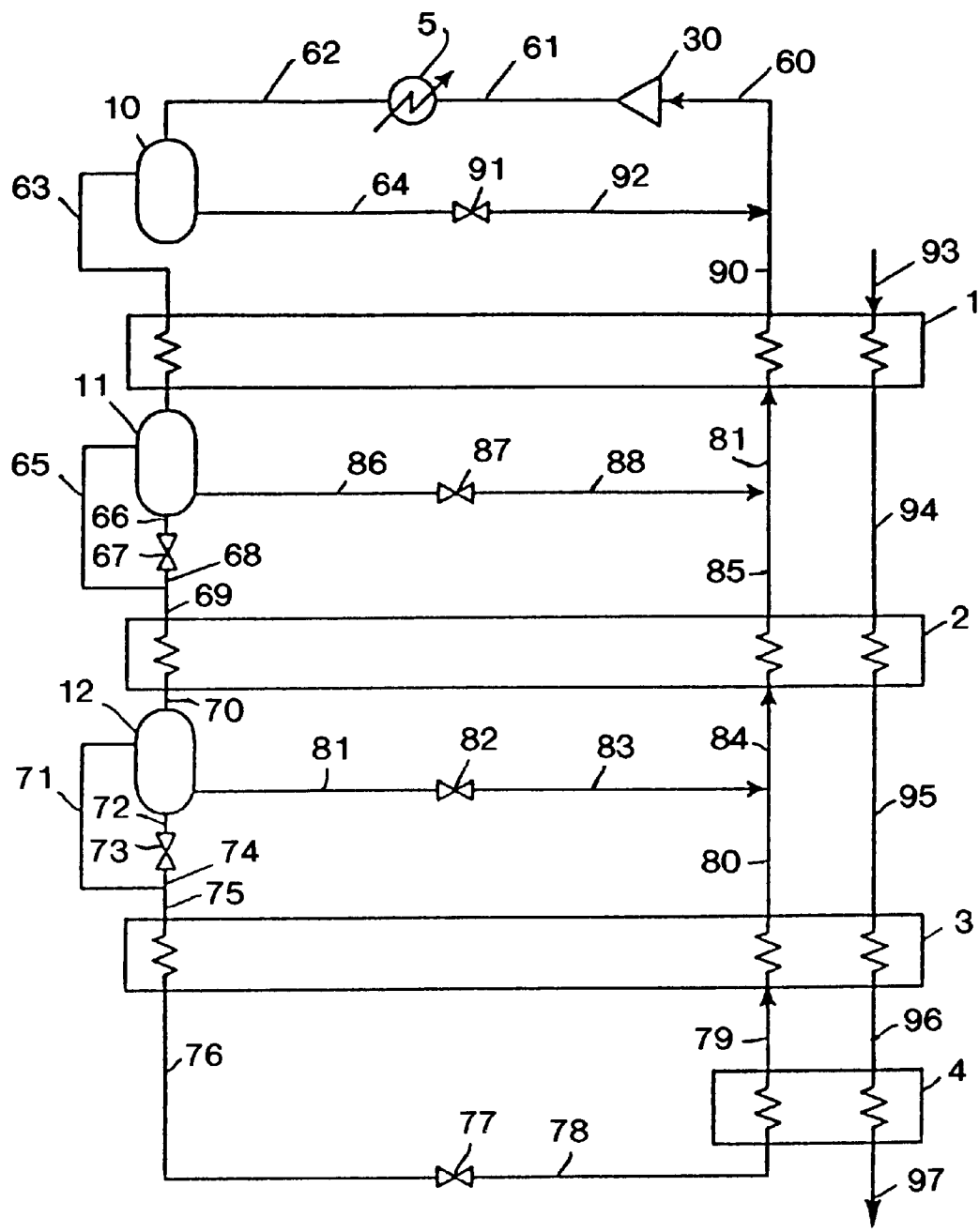
FIG. 1 is a schematic flow diagram of one preferred embodiment of the internal recycle cooling system of this invention.

The invention will be described in greater detail with reference to the Drawings. Referring now to FIG. 1, multicomponent refrigerant fluid 60, comprising at least two components having different volatilities, is compressed by passage through compressor 30 to a pressure generally within the range of from 100 to 600 pounds per square inch absolute (psia). The compression may be through a single stage or through multiple stages. Preferably the compression ratio, i.e. the ratio of the pressure of compressed multicomponent refrigerant fluid 61 to that of fluid 60 is within the range of from 3 to 15 and most preferably exceeds 5. The compressed multicomponent refrigerant fluid 61 is cooled of the heat of compression in aftercooler 5 to form stream 62. In the event compressor 30 is an oil lubricated compressor, stream 62 may be passed to separator 10 wherein any oil in stream 62 is separated and recycled to compressor 60 as shown by line 64, valve 91 and line 92.

Compressed multicomponent refrigerant fluid is passed, as shown by line 63, through heat exchanger 1 wherein it is partially condensed by indirect heat exchange in heat exchanger 1 with warming multicomponent refrigerant fluid as will be more fully discussed below, and resulting partially condensed multicomponent refrigerant fluid 51 is passed to phase separator 11 wherein it is separated into a liquid portion and a remaining portion. Liquid portion 86, containing at least a majority of and preferably most of or substantially all of the highest boiling or least volatile component of the multicomponent refrigerant fluid, is expanded through valve 87 to generate refrigeration and resulting expanded refrigeration bearing fluid 88 is passed into the return or warming leg of the cooling circuit. It is then passed in stream 89 to heat exchanger 1 wherein it is vaporized, to, inter alia, effect the cooling of product fluid, and then in stream 90 recycled back to compressor 30.

Some liquid from phase separator 11 in stream 66 may be passed through flow control valve 67 to form stream 68 which is combined with vapor stream 65 from phase separator 11 to form remaining portion 69 which may be all vapor or may be a two phase stream. This remaining portion is passed through heat exchanger 2 wherein it is cooled and preferably partially condenses by indirect heat exchange with warming multicomponent refrigerant fluid and the resulting cooled remaining portion is expanded to generate refrigeration and then warmed by indirect heat exchange with product fluid at a colder temperature than the heat exchange of the product fluid with the internally recycled liquid portion. In the embodiment illustrated in FIG. 1 partially condensed stream 70 from heat exchanger 2 is passed into phase separator 12 and separated into a remaining vapor portion and a remaining liquid portion. Remaining liquid portion is passed out from phase separator 12 in line 81, expanded through valve 82 to generate refrigeration, and resulting expanded refrigeration bearing fluid 83 is passed into the return or warming leg of the cooling circuit. It is then passed in stream 84 to heat exchanger 1 wherein it is vaporized to, inter alia, cool the product fluid and then from heat exchanger 2 in stream 85 is combined with stream 88 to form stream 89 for recycle to compressor 30.

Some liquid from phase separator 12 in stream 72 may be passed through flow control valve 73 to form stream 74 which is combined with remaining vapor portion 71 from phase separator 12 to form stream 75 which may be all vapor or may be a two phase stream. Stream 75 is passed through heat exchanger 3 wherein it is cooled and preferably completely condensed by indirect heat exchange with warming multicomponent refrigerant fluid. Resulting stream 76 is expanded through valve 77 to generate refrigeration and resulting refrigeration bearing stream 78 is warmed and preferably vaporized in the warming leg of the cooling circuit by passage through heat exchangers 4 and 3 as indicated by streams 79 and 80. Resulting stream 80 is combined with stream 83 to form stream 84 for recycle to the compressor.

Product fluid 93, which may be industrial gas such as nitrogen or oxygen, is cooled by passage through heat exchanger 1 by indirect heat exchange with vaporizing liquid portion as was previously described. Resulting cooled product fluid 94 is further cooled by indirect heat exchange with remaining portion. In the embodiment illustrated in FIG. 1 the further cooling is carried out by passage through heat exchangers 2, 3 and 4 as shown using piping 94, 95, 96 and 97 to produce the further cooled product fluid in line 97. Preferably the product fluid 93 is in the gaseous state and the further cooled product fluid 97 is in the liquid state.

Figure 2:
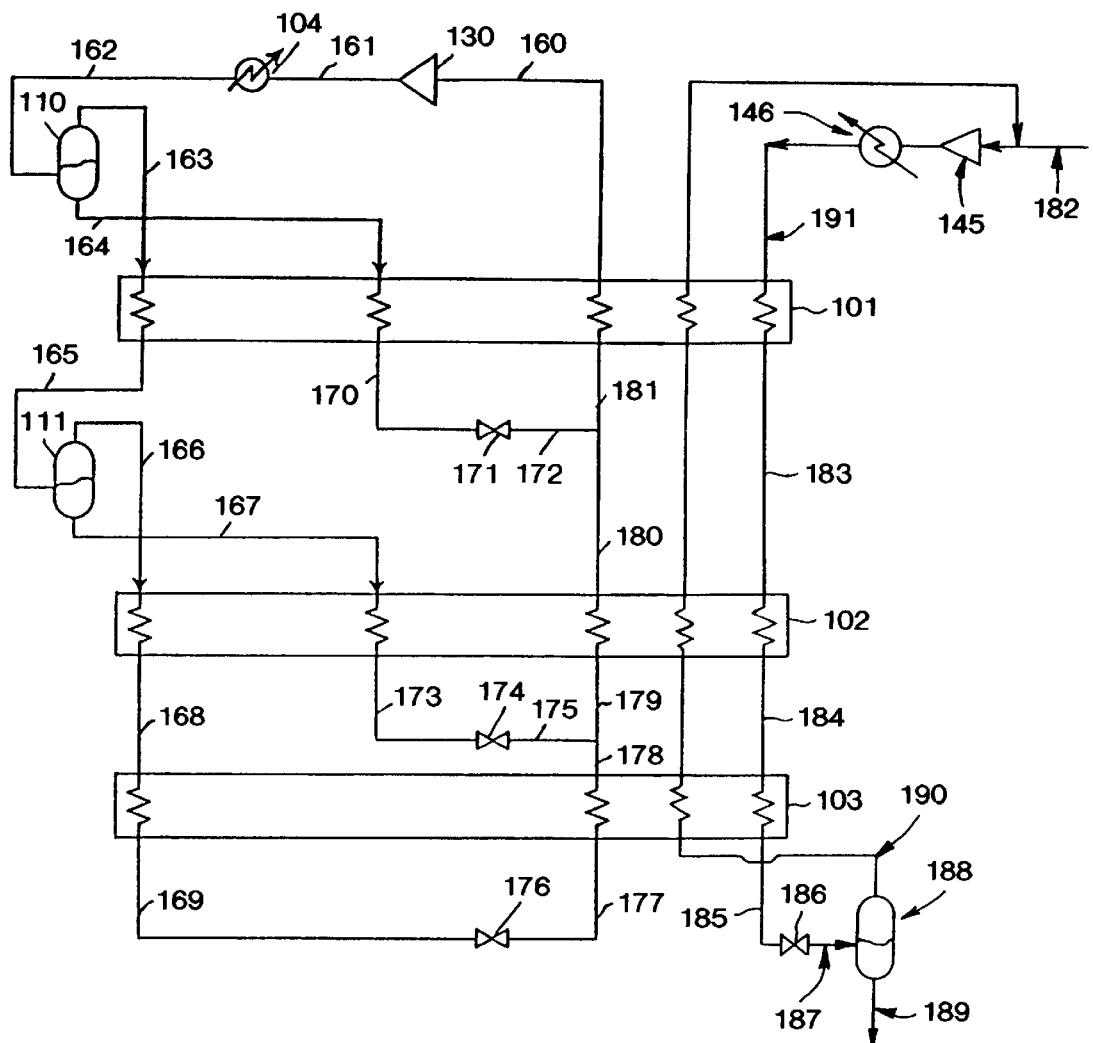
FIG. 2 is a schematic flow diagram of another preferred embodiment of the internal recycle cooling system of the invention employing product recycle.

FIG. 2 illustrates another embodiment of the invention wherein the liquid portion of the refrigerant fluid is subcooled prior to being expanded. The embodiment illustrated in FIG. 2 also illustrates the case where the compressor is not oil lubricated so that the oil separation step illustrated in FIG. 1 is not required.

Referring now to FIG. 2, multicomponent refrigerant fluid 160, comprising at least two components having different volatilities, is compressed by passage through compressor 130 to a pressure generally within the range of from 100 to 1000 psia. The compression may be through a single stage or through multiple stages. Preferably the compression ratio is within the range of from 3 to 15, and most preferably exceeds 5. The compressed multicomponent fluid 161 is cooled of the heat of compression in aftercooler 104 to form two phase stream 162 which is passed to separator 110 wherein it is separated into a liquid portion and a remaining portion. Liquid portion 164, containing at least a majority of and preferably most of or substantially all of the highest boiling or least volatile component of the multicomponent refrigerant fluid, is subcooled by passage through heat exchanger 101 by indirect heat exchange with warming multicomponent refrigerant fluid as will be more fully described below. Resulting subcooled multicomponent refrigerant fluid 170 is expanded through valve 171 to generate refrigeration and resulting expanded refrigeration bearing fluid 172 is passed into the return or warming leg of the cooling circuit. It is then passed in stream 181 to heat exchanger 101 wherein it is vaporized to, inter alia, effect the cooling of product fluid and then recycled in stream 160 to compressor 130.

Remaining portion is withdrawn from phase separator 110 as vapor stream 163 and passed through heat exchanger 101 wherein it is cooled and partially condensed to form two phase stream 165. Stream 165 is passed into phase separator 111 for separation into liquid and vapor. The liquid part of the remaining portion is passed from separator 111 in stream 167 to heat exchanger 102 wherein it is subcooled by indirect heat exchange with warming multicomponent refrigerant fluid. Resulting subcooled stream 173 is expanded through valve 174 to generate refrigeration and resulting expanded refrigeration bearing fluid 175 is passed into the return leg of the cooling circuit. It is then passed in stream 179 through heat exchanger 102 wherein it is vaporized to, inter alia, effect the further cooling of the product fluid, and then passed in streams 180 and 181 through heat exchanger 101 for further heat exchange and recycled in stream 160 to compressor 130.

The vapor part of the remaining portion is passed from separator 111 in stream 166 to heat exchanger 102 wherein it is cooled and preferably partially condensed to form stream 168, which is then passed through heat exchanger 103 wherein it is further cooled and preferably totally condensed. Resulting, preferably all liquid, stream 169 is expanded through valve 176 to generate refrigeration and resulting refrigeration bearing stream 177 is warmed and preferably at least partially vaporized in the warming leg of the cooling or refrigeration circuit by passage through heat exchanger 103. Resulting stream 178 is combined with stream 175 to form aforesaid stream 179 and, as previously described, passed through heat exchangers 102 and 101 for further warming and possibly vaporization before being recycled in stream 160 to compressor 130.

Product fluid 182, which is preferably an industrial gas, is compressed by passage through compressor 145 and cooled of the heat of compression in aftercooler 146 to form stream 191 which is cooled by passage through heat exchanger 101 by indirect heat exchange with vaporizing liquid portion as was previously described. Resulting cooled product fluid 183 is further cooled by indirect heat exchange with remaining portion. In the embodiment illustrated in FIG. 2 the further cooling is carried out by passage through heat exchangers 102 and 103 as shown using piping 184 to produce further cooled product 185 which is passed through valve 186 to form two phase stream 187.

Stream 187 is passed into phase separator 188 wherein it is separated into vapor and liquid fluids. Liquid fluid is withdrawn from separator 188 as stream 189 and passed on as further cooled product fluid to a use point and/or to storage. Vapor fluid is withdrawn from phase separator 188 as stream 190, warmed by passage through heat exchangers 103, 102 and 101 to assist in the cooling and further cooling of the product fluid, and then passed into stream 182 to form combined stream 191 for the cooling and further cooling through heat exchangers 101, 102 and 103.

Figure 3:
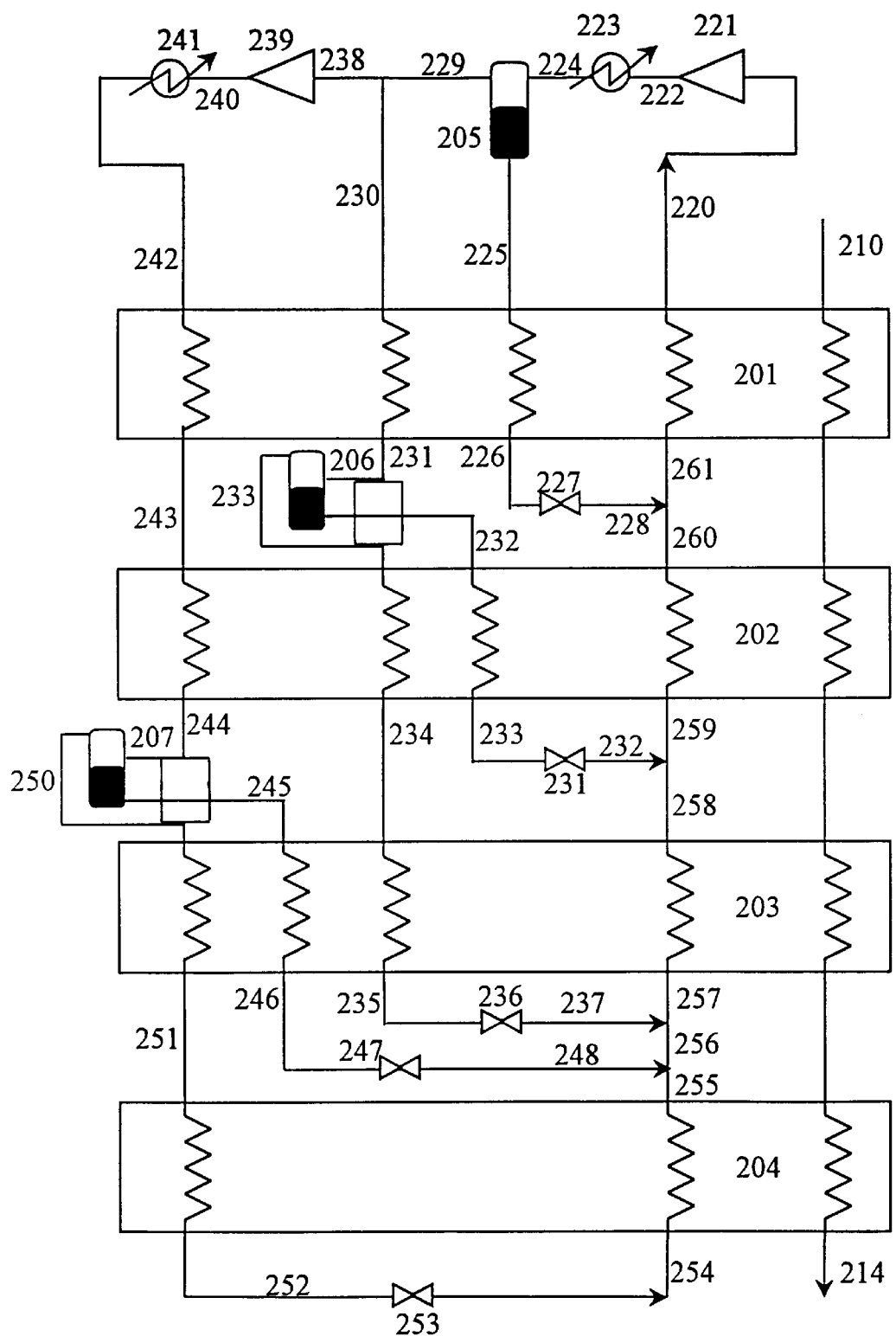
FIG. 3 is a schematic flow diagram of another preferred embodiment of the internal recycle cooling system of the invention employing multiple compressors.

FIG. 3 illustrates another embodiment of the invention wherein a single heat exchanger and more than one compressor is used for the refrigeration circuit. Alternatively, one may employ a multi-stage compressor in place of the multiple compressors illustrated in FIG. 3. Referring now to FIG. 3, multicomponent refrigerant fluid 220, comprising at least two components having different volatilities, is compressed by passage through compressor 221 to a first pressure. Compressed multicomponent fluid 222 is cooled of the heat of compression in aftercooler 223 and resulting two phase stream 224 is passed into phase separator 205.

Liquid from phase separator 205 is passed in stream 225 through heat exchanger 201 wherein it is subcooled to form stream 226. Stream 226 is passed through valve 227 and resulting stream 228 is combined with stream 260 in the warming leg of the refrigeration circuit to form stream 261. Vapor from phase separator 205 is passed out in stream 229 and a portion 230 is cooled and partially condensed by passage through heat exchanger 201. Resulting two phase stream 231 is passed to phase separator 206 and liquid is passed in stream 232 from phase separator 206 through heat exchanger 202 wherein it is subcooled to form stream 233. Stream 233 is passed through valve 231 and resulting stream 232 is combined with stream 258 in the warming leg of the refrigeration circuit to form stream 259. Vapor from phase separator 206 is passed in stream 233 through heat exchanger 202 wherein it is cooled and resulting stream 234 is further cooled by passage through heat exchanger 203 to form stream 235. Stream 235 is passed through valve 236 and resulting stream 237 is combined with stream 256 in the warming leg of the refrigeration circuit to form stream 257.

Remaining portion 238 of vapor stream 229 is further compressed to a second pressure, greater than the first pressure, by passage through compressor 239 and resulting stream 240 is cooled of the heat of compression by passage through aftercooler 241. Resulting stream 242 is cooled by passage through heat exchanger 201 and resulting stream 242 is cooled and partially condensed by passage through heat exchanger 202. Resulting two phase stream 244 which is passed to separator 207 wherein it is separated into a liquid portion and a remaining portion. Liquid portion 245, containing at least a majority of and preferably most of or substantially all of the highest boiling or least volatile component of the multicomponent refrigerant fluid, is subcooled by traverse of heat exchanger 203 by indirect heat exchange with warming multicomponent refrigerant fluid as will be more fully described below. Resulting subcooled refrigerant fluid in stream 246 is expanded through valve 247 to generate refrigeration and resulting expanded refrigeration bearing fluid 248 is passed into stream 255 and recycled to compressor 221 in the warming leg of the refrigeration circuit.

The remaining portion of stream 244 is withdrawn from phase separator 207 as vapor stream 250 and passed through heat exchanger 203 and then as stream 251 through heat exchanger 204 wherein it is cooled and preferably completely condensed. Resulting, preferably all liquid, stream 252 is expanded through valve 253 to generate refrigeration and resulting refrigeration bearing stream 254 is warmed and vaporized to, inter alia, effect the further cooling of the product fluid. Stream 254 is then combined with streams 248, 237, 232 and 228 as was previously describe and then recycled as stream 220 to compressor 221.

Product fluid 210, which is preferably an industrial gas, is cooled and then further cooled by passage through heat exchangers 201, 202, 203 and 204 by indirect heat exchanger with the vaporizing and/or warming portions of the multicomponent refrigerant fluid as was previously described. Resulting further cooled product fluid 214 is then passed on to a use point and/or to storage. Preferably product fluid 210 is in the gaseous state and further cooled product fluid 214 is in the liquid state.

The multicomponent refrigerant fluid useful in the practice of this invention contains at least two components. The choice of refrigerant components will depend on the refrigeration load versus temperature for the particular process application. Suitable components will be chosen depending upon their normal boiling points, latent heat, and flammability, toxicity, and ozone-depletion potential.

One preferable embodiment of the multicomponent refrigerant fluid useful in the practice of this invention comprises at least one component from the group consisting of fluorocarbons, hydrofluorocarbons and fluoroethers and at least one component from the group consisting of fluorocarbons, hydrofluorocarbons, fluoroethers and atmospheric gases.

Another preferable embodiment of the multicomponent refrigerant fluid useful in the practice of this invention comprises at least two components from the group consisting of fluorocarbons, hydrofluorocarbons and fluoroethers and at least one atmospheric gas.

Another preferable embodiment of the multicomponent refrigerant fluid useful in the practice of this invention comprises at least two components from the group consisting of fluorocarbons, hydrofluorocarbons and fluoroethers, and at least two atmospheric gases.

Another preferable embodiment of the multicomponent refrigerant fluid useful in the practice of this invention comprises at least one fluoroether and at least one component from the group consisting of fluorocarbons, hydrofluorocarbons, fluoroethers and atmospheric gases.

In one preferred embodiment the multicomponent refrigerant fluid consists solely of fluorocarbons. In another preferred embodiment the multicomponent refrigerant fluid consists solely of fluorocarbons and hydrofluorocarbons. In another preferred embodiment the multicomponent refrigerant fluid consists solely of fluorocarbons and atmospheric gases. In another preferred embodiment the multicomponent refrigerant fluid consists solely of fluorocarbons, hydrofluorocarbons and fluoroethers. In another referred embodiment the multicomponent refrigerant fluid consists solely of fluorocarbons, fluoroethers and atmospheric gases.

Although the multicomponent refrigerant fluid useful in the practice of this invention may contain other components such as hydrochlorofluorocarbons and/or hydrocarbons, preferably the multicomponent refrigerant fluid contains no hydrochlorofluorocarbons. In another preferred embodiment of the invention the multicomponent refrigerant fluid contains no hydrocarbons, and most preferably the multicomponent refrigerant fluid contains neither hydrochlorofluorocarbons nor hydrocarbons. Most preferably the multicomponent refrigerant fluid is non-toxic, non-flammable and non-ozone-depleting and most preferably every component of the multicomponent refrigerant fluid is either a fluorocarbon, hydrofluorocarbon, fluoroether or atmospheric gas.

The invention is particularly advantageous for use in efficiently reaching cryogenic temperatures from ambient temperatures. Tables 1–5 list preferred examples of multicomponent refrigerant fluid mixtures useful in the practice of this invention. The concentration ranges given in Tables 1–5 are in mole percent.

TABLE 1

| COMPONENT | CONCENTRATION RANGE |
|---|---|
| $C_5F_{12}$ | 5–25 |
| $C_4F_{10}$ | 0–15 |
| $C_3F_8$ | 10–40 |
| $C_2F_6$ | 0–30 |
| $CF_4$ | 10–50 |
| Ar | 0–40 |
| $N_2$ | 10–80 |
| Ne | 0–10 |
| He | 0–10 |

TABLE 2

| COMPONENT | CONCENTRATION RANGE |
|---|---|
| $C_3H_3F_5$ | 5–25 |
| $C_4F_{10}$ | 0–15 |
| $C_3F_8$ | 10–40 |
| $CHF_3$ | 0–30 |
| $CF_4$ | 10–50 |
| Ar | 0–40 |
| $N_2$ | 10–80 |
| Ne | 0–10 |
| He | 0–10 |

TABLE 3

| COMPONENT | CONCENTRATION RANGE |
|---|---|
| $C_3H_3F_5$ | 5–25 |
| $C_3H_2F_6$ | 0–15 |
| $C_2H_2F_4$ | 5–20 |
| $C_2HF_5$ | 5–20 |
| $C_2F_6$ | 0–30 |
| $CF_4$ | 10–50 |
| Ar | 0–40 |
| $N_2$ | 10–80 |
| Ne | 0–10 |
| He | 0–10 |

TABLE 4

| COMPONENT | CONCENTRATION RANGE |
|---|---|
| $CHF_2$—O—$C_2HF_4$ | 5–25 |
| $C_4F_{10}$ | 0–15 |
| $CF_3$—O—$CHF_2$ | 10–40 |
| $CF_3$—O—$CF_3$ | 0–20 |
| $C_2F_6$ | 0–30 |
| $CF_4$ | 10–50 |
| Ar | 0–40 |
| $N_2$ | 10–80 |
| Ne | 0–10 |
| He | 0–10 |

TABLE 5

| COMPONENT | CONCENTRATION RANGE |
|---|---|
| $C_3H_3F_5$ | 5–25 |
| $C_3H_2F_6$ | 0–15 |
| $CF_3$—O—$CHF_3$ | 10–40 |
| $CHF_3$ | 0–30 |
| $CF_4$ | 0–25 |
| Ar | 0–40 |
| $N_2$ | 10–80 |
| Ne | 0–10 |
| He | 0–10 |

The invention is especially useful for providing refrigeration over a wide temperature range, particularly one which encompasses cryogenic temperatures. In a preferred embodiment of the invention each of the two or more components of the refrigerant mixture has a normal boiling point which differs by at least 5 degrees Kelvin, more preferably by at least 10 degrees Kelvin, and most preferably by at least 20 degrees Kelvin, from the normal boiling point of every other component in that refrigerant mixture. This enhances the effectiveness of providing refrigeration over a wide temperature range, particularly one which encompasses cryogenic temperatures. In a particularly preferred embodiment of the invention, the normal boiling point of the highest boiling component of the multicomponent refrigerant fluid is at least 50° K., preferably at least 100° K., most preferably at least 200° K., greater than the normal boiling point of the lowest boiling component of the multicomponent refrigerant fluid.

The components and their concentrations which make up the multicomponent refrigerant fluid useful in the practice of this invention are such as to form a variable load multicomponent refrigerant fluid and preferably maintain such a variable load characteristic throughout the whole temperature range of the method of the invention. This markedly enhances the efficiency with which the refrigeration can be generated and utilized over such a wide temperature range.

The defined preferred group of components has an added benefit in that they can be used to form fluid mixtures which are non-toxic, non-flammable and low or non-ozone-depleting. This provides additional advantages over conventional refrigerants which typically are toxic, flammable and/or ozone-depleting.

One preferred variable load multicomponent refrigerant fluid useful in the practice of this invention which is non-toxic, non-flammable and non-ozone-depleting comprises two or more components from the group consisting of $C_5F_{12}$, $CHF_2$—O—$C_2HF_4$, $C_4HF_9$, $C_3H_3F_5$, $C_2F_5$—O—$CH_2F$, $C_3H_2F_6$, $CHF_2$—O—$CHF_2$, $C_4F_{10}$, $CF_3$—O—$C_2H_2F_3$, $C_3HF_7$, $CH_2F$—O—$CF_3$, $C_2H_2F_4$, $CHF_2$—O—$CF_3$, $C_3F_8$, $C_2HF_5$, $CF_3$—O—$CF_3$, $C_2F_6$, $CHF_3$, $CF_4$, $O_2$, Ar, $N_2$, Ne and He. Although the invention has been described in detail with reference to certain preferred embodiments, those skilled in the art will recognize that there are other embodiments of the invention within the spirit and the scope of the claims. For example, one or more of the expansion valves used with the illustrated embodiments could be replaced by turboexpanders for generating refrigeration.

What is claimed is:

1. A method for cooling a product fluid comprising:

(A) compressing a multicomponent refrigerant fluid comprising at least two components having different volatilities;

(B) partially condensing the compressed multicomponent refrigerant fluid and separating the resulting partially condensed multicomponent refrigerant fluid into a liquid portion and a remaining portion;

(C) expanding the liquid portion to generate refrigeration and vaporizing the expanded liquid portion by indirect heat exchange with product fluid to produce cooled product fluid; and (D) further cooling at least some of the remaining portion, expanding the further cooled remaining portion to generate refrigeration, and warming the expanded remaining portion by indirect heat exchange with cooled product fluid to produce further cooled product fluid.

2. The method of claim 1 wherein the liquid portion is subcooled prior to being expanded.

3. The method of claim 1 wherein the liquid portion contains the majority of the least volatile component of the multicomponent refrigerant fluid.

4. The method of claim 1 wherein the cooling of the remaining portion causes the remaining portion to be partially condensed, the partially condensed remaining portion is separated into a remaining vapor portion and a remaining liquid portion, and the remaining liquid portion is expanded to generate refrigeration and vaporized by indirect heat exchange with cooled product fluid to produce further cooled product fluid.

5. The method of claim 4 wherein the remaining liquid portion is subcooled prior to being expanded.

6. The method of claim 4 wherein the remaining vapor portion is condensed, the resulting condensed remaining vapor portion is expanded to generate refrigeration, and the resulting condensed remaining vapor portion is vaporized by indirect heat exchange with further cooled product fluid.

7. The method of claim 1 wherein the further cooled product fluid is, at least in part, in the liquid phase.

8. The method of claim 1 wherein further cooled product fluid is expanded and a vapor portion of the expanded further cooled product is warmed by indirect heat exchange with cooling product fluid.

9. The method of claim 1 wherein the multicomponent refrigerant fluid is compressed to a first pressure, a portion of the first pressure fluid is warmed by indirect heat exchange with product fluid, and another portion of the first pressure fluid is further compressed to a second pressure greater than said first pressure prior to the partial condensation of step (B).

10. The method of claim 1 wherein the multicomponent refrigerant fluid comprises at least one component from the group consisting of fluorocarbons, hydrofluorocarbons and fluoroethers and at least one component from the group consisting of fluorocarbons, hydrofluorocarbons, fluoroethers and atmospheric gases.

11. The method of claim 1 wherein the multicomponent refrigerant fluid comprises at least two components from the group consisting of fluorocarbons, hydrofluorocarbons and fluoroethers and at least one atmospheric gas.

12. The method of claim 1 wherein the multicomponent refrigerant fluid comprises at least two components from the group consisting of fluorocarbons, hydrofluorocarbons and fluoroethers and at least two atmospheric gases.

13. The method of claim 1 wherein the multicomponent refrigerant fluid comprises at least one fluoroether and at least one component from the group consisting of fluorocarbons, hydrofluorocarbons, fluoroethers and atmospheric gases.

14. The method of claim 1 wherein each of the components of the multicomponent refrigerant fluid has a normal boiling point which differs by at least 5 degrees Kelvin from the normal boiling point of each of the other components of the multicomponent refrigerant fluid.

15. The method of claim 1 wherein the normal boiling point of the highest boiling component of the multicomponent refrigerant fluid is at least 50° K. greater than the normal boiling point of the lowest boiling component of the multicomponent refrigerant fluid.

16. The method of claim 1 wherein the multicomponent refrigerant fluid comprises at least two components from the group consisting of $C_5F_{12}$, $CHF_2$—O—$C_2HF_4$, $C_4HF_9$, $C_3H_3F_5$, $C_2F_5$—O—$CH_2F$, $C_3H_2F_6$, $CHF_2$—O—$CHF_2$, $C_4F_{10}$, $CF_3$—O—$C_2H_2F_3$, $C_3HF_7$, $CH_2F$—O—$CF_3$, $C_2H_2F_4$, $CHF_2$—O—$CF_3$, $C_3F_8$, $C_2HF_5$, $CF_3$—O—$CF_3$, $C_2F_6$, $CHF_3$, $CF_4$, $O_2$, Ar, $N_2$, Ne and He.

17. The method of claim 1 wherein the multicomponent refrigerant fluid is a variable load multicomponent refrigerant fluid throughout the whole temperature range of the method.

* * * * *